US009508309B2

(12) United States Patent
Mistry

(10) Patent No.: US 9,508,309 B2
(45) Date of Patent: *Nov. 29, 2016

(54) COMPUTER-BASED METHOD FOR CROPPING USING A TRANSPARENCY OVERLAY/IMAGE OVERLAY SYSTEM

(71) Applicant: Vispi Burjor Mistry, Mississauga (CA)

(72) Inventor: Vispi Burjor Mistry, Mississauga (CA)

( * ) Notice: Subject to any disclaimer, the term of this patent is extended or adjusted under 35 U.S.C. 154(b) by 25 days.

This patent is subject to a terminal disclaimer.

(21) Appl. No.: 14/605,591

(22) Filed: Jan. 26, 2015

(65) Prior Publication Data

US 2015/0130844 A1    May 14, 2015

Related U.S. Application Data

(63) Continuation-in-part of application No. 13/619,340, filed on Sep. 14, 2012, now Pat. No. 8,976,194.

(51) Int. Cl.
*G09G 5/00* (2006.01)
*G09G 5/02* (2006.01)
*G09G 5/14* (2006.01)
*G06T 11/60* (2006.01)

(52) U.S. Cl.
CPC ............... *G09G 5/00* (2013.01); *G06T 11/60* (2013.01); *G09G 5/026* (2013.01); *G09G 5/14* (2013.01); *G06T 2210/22* (2013.01); *G09G 2340/02* (2013.01); *G09G 2340/14* (2013.01)

(58) Field of Classification Search
None
See application file for complete search history.

(56) References Cited

U.S. PATENT DOCUMENTS

| 7,093,198 | B1 | 8/2006 | Paatero et al. |
| 7,873,911 | B2 | 1/2011 | Gopalakrishnan |
| 8,976,194 | B2 * | 3/2015 | Mistry ................ G09G 5/00 345/620 |
| 2008/0084429 | A1 | 4/2008 | Wissinger |
| 2012/0278722 | A1 * | 11/2012 | Raleigh ................ H04L 12/14 715/735 |
| 2013/0321460 | A1 | 12/2013 | Linburn et al. |

OTHER PUBLICATIONS

Finkelstein, "Crop around an image in PowerPoint 2003", PowerPoint Tips Blog, Aug. 24, 2011.
Gabrielle, "Crop Around an Irregular Shape—Speaking PowerPoint tip #16", YouTube, Mar. 30, 2012.
T. Kremer, Patent Cooperation Treaty International Search Report & Written Opinion of the International Searching Authority, May 5, 2014, ISA/FIPS, Quebec, Canada.
Bair Art Editions, "Adjusting Color & Exposure in Adobe Photoshop: How to Use Layers: The Basics", Wayback Machine, Dec. 29, 2013.
"Sling Note for the iPad", Slideshare, Nov. 21, 2011.
"Photoshop Touch walkthrough: the app tha changes the rules of what tablets can do", APC, Nov. 3, 2011.

* cited by examiner

*Primary Examiner* — Carlos Perromat
(74) *Attorney, Agent, or Firm* — Hankin Patent Law, APC; Kevin Schraven; Jimmy Sauz

(57) ABSTRACT

The present disclosure provides a method for cropping one or more files in freeform using transparent or non-transparent layers. Specifically, the embodiments allow a user to crop a file with irregular/freeform boundaries while using a plurality of transparent or non-transparent layers that overlay the original file. The transparent layers overlap the image data for cropping, so that the finalized cropped image may be copied, pasted, or imported into another document while leaving the original file unaltered. The cropped portion of the image may also be sent or emailed by the user.

20 Claims, 16 Drawing Sheets

FIG. 13

Matrix of Image with Background and iOS® combination for Freeform Cropping on iPod(s)

| iOS® is 'Less than' OR 'Equal to' OR 'Greater than' 7 | iOS® < 7 iPod-Touch ® 2nd Gen | iOS® < 7 iPod-Touch ® 3rd Gen | iOS® < 7 iPod-Touch ® 4th Gen |
|---|---|---|---|
| NON - RETINA® Display | | | |
| Smaller Image (Low DPI) - Freeform | Y | Y | |
| Larger Image (High DPI) - Freeform or Circle Shape(s) | BG is Black or Dark | BG is Black or Dark | |
| Larger Image (High DPI) - Box Shape | BG is Black or Dark | BG is Black or Dark | |
|  | BG is White or Light | BG is White or Light | |
| RETINA® Display | | | |
| Smaller Image (Low DPI) - Freeform | | | Y |
| Larger Image (High DPI) - Freeform or Circle Shape(s) | | | BG is Black or Dark |
| Larger Image (High DPI) - Box Shape | | | BG is Black or Dark |
|  | | | BG is White or Light |

| iOS® is 'Less than' OR 'Equal to' OR 'Greater than' 7 | iOS® >= 7 iPod-Touch ® 4th Gen | iOS® < 7 iPod-Touch ® 5th Gen | iOS® >= 7 iPod-Touch ® 5th Gen |
|---|---|---|---|
| NON - RETINA® Display | | | |
| Smaller Image (Low DPI) - Freeform | Y | Y | Y |
| Larger Image (High DPI) - Freeform or Circle Shape(s) | BG is White or Light | BG is Black or Dark | BG is White or Light |
| Larger Image (High DPI) - Box Shape | BG is White or Light | BG is Black or Dark | BG is White or Light |
|  | BG is Black or Dark | BG is White or Light | BG is Black or Dark |
| RETINA® Display | | | |
| Smaller Image (Low DPI) - Freeform | | | Y |
| Larger Image (High DPI) - Freeform or Circle Shape(s) | | | BG is White or Light |
| Larger Image (High DPI) - Box Shape | | | BG is White or Light |
|  | | | BG is Black or Dark |

Note:-
BG = Background
DPI = Image Resolution in Dots Per Inch

COMPUTER-BASED METHOD FOR CROPPING USING A TRANSPARENCY OVERLAY/IMAGE OVERLAY SYSTEM

CROSS REFERENCE TO RELATED APPLICATIONS

This Application is a Continuation-in-Part of U.S. Non-Provisional patent application Ser. No. 13/619,340, filed on Sep. 14, 2012, titled "Computer-Based Method for Cropping Using a Transparency Overlay/Image Overlay System", by inventor Vispi Burjor Mistry, the contents of which are expressly incorporated herein by this reference as though set forth in their entirety, and to which priority is claimed.

FIELD OF USE

The present disclosure generally relates to methods for cropping images and documents using transparent layers. More particularly, the present disclosure relates to methods that allow a user to crop an overlay image in freeform on a separate transparent layer without editing the original image.

All products and company names herein are trademarks™ or registered® trademarks of their respective holders. Reference to them is for compatibility purposes only and does not imply any affiliation with or endorsement by them.

BACKGROUND

For decades, image manipulation software and digital editors have been used to crop digital images. Digital image cropping allows a user to create a new image by selecting or defining a desired region of an image, which is typically box type in shape. The desired portion is generally captured or preserved and the unwanted portion (i.e., the remaining area outside the rectangle) is discarded. The resolution of the area cropped is generally not reduced.

Most conventional cropping methods, however, lack freeform cropping and instead involve rectangular shapes rather than irregular boundaries. The user normally defines a rectangle around the portion of the image that the user would like to preserve. This is normally achieved by selecting a cropping feature in an application; choosing the desired amount of cropping by dragging a rectangular box around the image, and saving the cropped image. This, in turn, leaves the user with little ability to remove certain unwanted areas of the cropped image while preserving the remaining cropped image for further editing such as copying, pasting, or sending.

Additionally, most cropping methods typically lack the use of transparent layers. Most software programs and photo editing software that utilize cropping methods require the altering of the original image, which creates problems when the user decides to revert back to the original image after making a mistake in cropping. White borders, for instance, may result on some sides of the images when the original image is cropped.

Moreover, most cropping programs are primarily aimed for desktop computers rather than mobile computing devices. Tablet computers and cell phone devices, for instance, which typically include a photo editor, generally lack any freeform cropping functionality. If a mobile device, on the other hand, does include a cropping feature, the feature is generally confined to only dragging a rectangular box around the desired image.

Therefore, what is needed is a method for cropping any image and document in freeform for mobile computing devices. The cropped image may be copied and/or pasted to another document or sent to another person, and preferably, a copy of the original image or PDF document is cropped to allow a user to reedit a file differently for future use.

SUMMARY OF EMBODIMENTS

To minimize the limitations in the prior art, and to minimize other limitations that will become apparent upon reading and understanding the present specification, the following discloses a computer-based method for cropping files for a mobile computing device. To simplify the use of certain words that are repeated, we have described the same as follows: the terms "Image-Transparency-A" or "Image/Transparency-A" refers to an Image/Transparency which is either created by the user or copied by the user from some other location or an already existing image, of a document or a photograph or an image file. The terms "Image-Transparency" or "Image/Transparency" refers to the image items which could either be a .JPEG/.JPG (Joint Photographic Experts Group) image file or a .PNG (Portable Network Graphics) image file.

One embodiment may be a computer-based method for cropping images displayed on an electronic data processing unit, the steps comprising: providing an electronic data processing unit; wherein the electronic data processing unit comprises one or more display screens, one or more applications, and one or more files; displaying the one or more applications on the one or more display screens; creating a first transparent image-transparent transparency with the one or more applications; creating an Image-Transparency-A of the one or more files with the one or more applications; positioning Image-Transparency-A above the first transparent image-transparency to create a combination of Image-Transparency-A and first transparent image-transparency; processing the combined Image-Transparency-A above and/or and the first transparent image-transparency to create a first processed image-transparency (Note: These are digital images and are generally relative from the perspective of the user. Thus, although the combined Image-Transparency-A may be positioned above the first transparent image-transparency, a person of ordinary skill in the art should understand that Image-Transparency-A may be positioned anywhere with respect to the first transparent image-transparency); creating a second transparent image-transparency; positioning the second transparent image-transparency above the first processed image-transparency; defining a cropped area on the second transparent image-transparency by a user, which we call as the second processed image-transparency; taking that second processed image-transparency which comprises a first cropped portion and a first un-cropped portion; wherein the first cropped portion is defined by the cropped area; superimposing the second processed image-transparency above the first processed image-transparency; creating a second cropped portion on the processed image by using the first cropped portion of the second processed image-transparency. The first cropped portion and the first un-cropped portion typically contrasts in one or more colors of dark and light or black and white. Then calculating one or more boundaries of the second crop portion; and creating a freeform cropped image. Preferably, the freeform cropped image comprises of a rectangular box encapsulating the freeform-irregular cropped area. Preferably, the defining of a cropped area step is performed in freeform by the user. The defining of the cropped area step may further comprise the steps of: creating a freeform line; wherein the freeform line is made by continuously contacting a surface of the one or more displays from a starting point to an endpoint; and enclosing the freeform line by connecting the starting point and the endpoint with a straight line. Preferably, the data processing unit is a mobile electronic device. The steps of the computer-based method for cropping images may further comprise: copying the freeform cropped image; and pasting the freeform cropped image into one or more documents. The steps of the computer-based method for cropping images may further comprise sending electronically the freeform cropped image to a second electronic data processing unit. The one or more files may be one or more image files. The one or more files may be one or more text files. The one or more files may be a portable document format file.

Another embodiment may be a computer-based method for cropping images displayed on a mobile electronic device, the steps comprising: providing a mobile electronic device; wherein the mobile electronic device comprises one or more display screens, one or more applications, and one or more text files; displaying the one or more applications on the one or more display screens; creating a first transparent image-transparency with the one or more applications; creating a Image-Transparency-A of the one or more text files with the one or more applications; positioning the Image-Transparency-A above the first transparent image-transparency to create a combination of Image-Transparency-A and first transparent image-transparency; processing the combined Image-Transparency-A and the first transparent image-transparency to create a first processed image-transparency; creating a second transparent image-transparency; positioning the second transparent image-transparency above the first processed image-transparency; defining a cropped area on the second transparent image-transparency by a user, which we call as the second processed image-transparency; taking that second processed image-transparency which comprises a first cropped portion and a first un-cropped portion; wherein the first cropped portion is defined by the cropped area; superimposing the second processed image-transparency above the first processed image-transparency; creating a second cropped portion on the processed image by using the first cropped portion of the second processed image-transparency. The first cropped portion and the first un-cropped portion typically contrasts in one or more colors of dark and light or black and white. Then calculating one or more boundaries of the second crop portion; and creating a freeform cropped image. Preferably, the freeform cropped image comprises a rectangular box encapsulating the freeform-irregular cropped area. Preferably, the defining of the cropped area step is performed in freeform by the user. The defining of the cropped area step preferably further comprises the steps of: creating a freeform line; wherein the freeform line is made by continuously contacting a surface of the one or more displays from a starting point to an endpoint; and enclosing the freeform line by connecting the starting point and the endpoint with a straight line. The steps of the computer-based method for cropping images may further comprise the step of copying the freeform cropped image and pasting the freeform cropped image to one or more documents. The steps of the computer-based method for cropping may further comprise the step of: sending electronically the freeform-irregular cropped image to a second electronic data processing unit.

Another embodiment may be a computer-based method for cropping images displayed on a mobile electronic device, the steps comprising: providing a mobile electronic device; wherein the mobile electronic device comprises one or more display screens, one or more applications, and one or more text files; displaying the one or more applications in the one or more display screens; creating a first transparent image-transparency with the one or more applications; creating a Image-Transparency-A of the one or more text files with the one or more applications; positioning the Image-Transparency-A above the first transparent image-transparency to create a combination of Image-Transparency-A above the first transparent image-transparency; processing the combined Image-Transparency-A above the first transparent image-transparency to create a processed image-transparency; creating a second transparent image-transparency; positioning the second transparent image-transparency above the first processed image-transparency; defining a cropped area on the second transparent image-transparency by creating a freeform line and enclosing the freeform line by connecting a starting point and an endpoint with a straight line; wherein the freeform line is made by continuously contacting a surface of the one or more displays from the starting point to the endpoint; which we call as the second processed image-transparency; taking that second processed image-transparency which comprises of a first cropped portion and a first un-cropped portion; wherein the first cropped portion and the first un-cropped portion contrast in one or more colors of dark and light or black and white; wherein the first cropped portion is defined by the cropped area; superimposing the second processed image above the first processed image-transparency; creating a second crop portion on the processed image-transparency by using the first cropped portion of the second processed image-transparency; calculating one or more boundaries of the second crop portion; creating a freeform-irregular cropped image-transparency; wherein the freeform cropped image-transparency comprises of a rectangular box encapsulating the freeform-irregular cropped area; copying the freeform cropped image-transparency; pasting the freeform cropped image-transparency to one or more documents and files; and sending electronically the one or more documents to a second electronic data processing unit.

It is an object to provide the user with a mobile electronic data processing unit that allows users to review and crop images and documents in freeform to share them on the device.

It is an object to provide an inexpensive and easy to use software application that comes preloaded or can be user downloaded on a mobile computer such as a mobile cell phone or a tablet computer.

It is an object to provide the user with an image editor that can take existing images or documents from a personal computer, phone or email and re-format them in any shape, size, or form for cropping or editing.

It is an object to provide a user with an application for mobile devices that crops images and documents in freeform—i.e., in any shape, size, or form. Preferably, the application will provide a crop and paste functionality.

It is an object to provide an application for mobile devices that allows a user to save, or paste-on or send only the cropped portion of an image or document. Preferably, the application will create a copy of the image or document to edit differently for future uses.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

FIG. 13 is a table of a matrix of one embodiment of the computer-based method for cropping using transparency overlay system and shows how to fill the cropped area in relation to the device type, and display type; and also details which image format type is to be made during processing, and saving of the image-transparency during the freeform-irregular cropping process.

FIG. 14 is another table of a matrix of one embodiment of the computer-based method for cropping using transparency overlay system for an Apple® iPod® and shows how to fill the cropped area in relation to the device type, IOS® version, and display type for the iPod®; and also details which image resolution and shape is to be made during processing and saving of the image-transparency during the freeform-irregular cropping process.

FIG. 15 is another table of a matrix of one embodiment of the computer-based method for cropping using transparency overlay system for an Apple® iPhone® and shows how to fill the cropped area in relation to the device type, IOS® version, and display type for the iPhone®; and also details which image resolution and shape is to be made during processing and saving of the image-transparency during the freeform-irregular cropping process.

FIG. 16 is another table of a matrix of one embodiment of the computer-based method for cropping using transparency overlay system for an Apple® iPad® and shows how to fill the cropped area in relation to the device type, IOS® version, and display type for the iPad®; and also details which image resolution and shape is to be made during processing and saving of the image-transparency during the freeform-irregular cropping process.

DETAILED DESCRIPTION OF THE DRAWINGS

Figure 1:
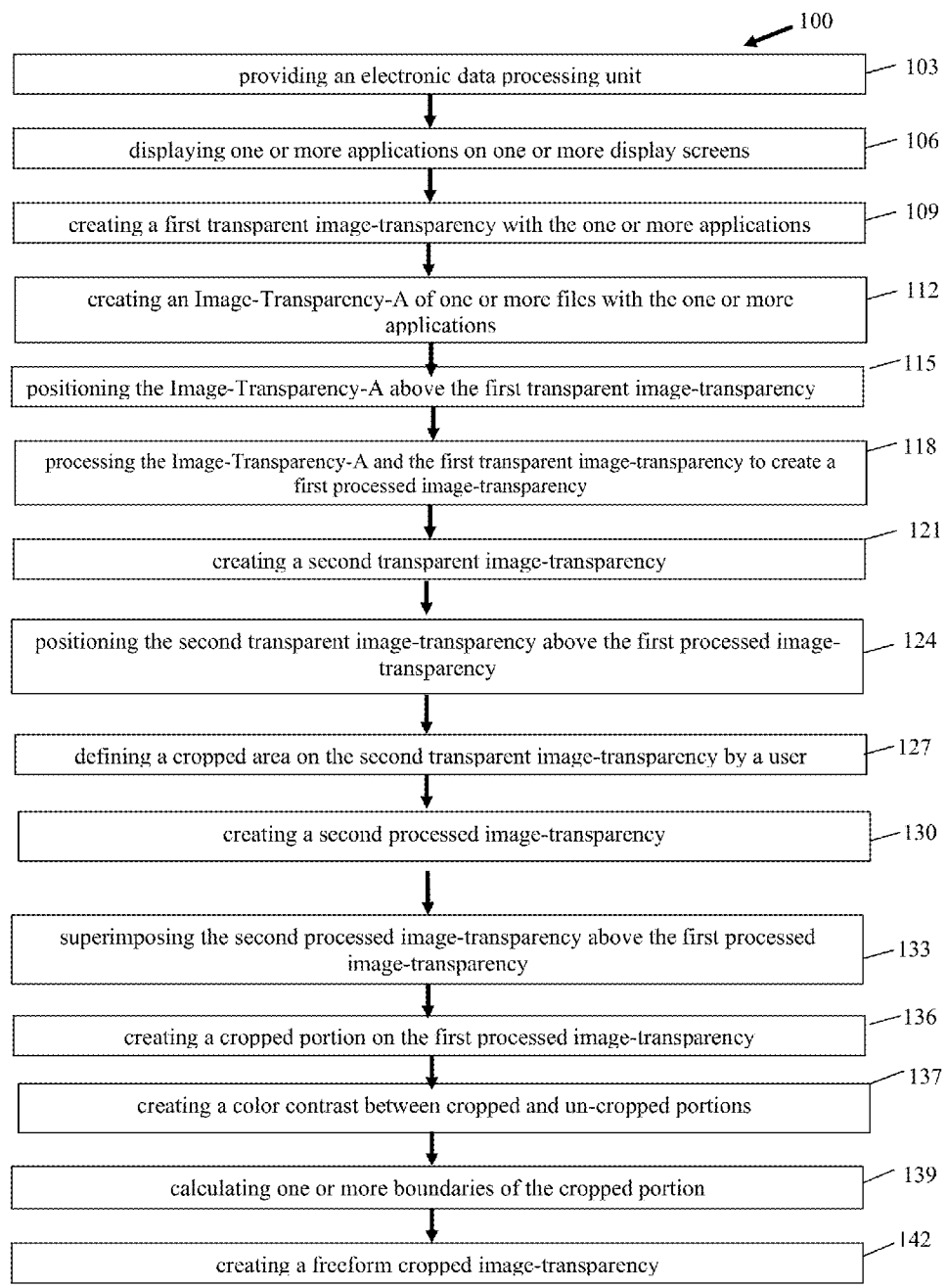
FIG. 1 is a block diagram of one embodiment of the computer-based method for cropping using transparency overlay system.

In the following detailed description of various embodiments, numerous specific details are set forth in order to provide a thorough understanding of various aspects of the one or more embodiments. However, one or more embodiments may be practiced without some or all of these specific details. In other instances, well-known methods, procedures, and/or components have not been described in detail so as not to unnecessarily obscure aspects of embodiments.

While multiple embodiments are disclosed, still other embodiments of the present disclosure will become apparent to those skilled in the art from the following detailed description, which shows and describes illustrative embodiments. As will be realized, the embodiments are capable of modifications in various obvious aspects, all without departing from the spirit and scope. Accordingly, the screen shot figures, and the detailed descriptions thereof, are to be regarded as illustrative in nature and not restrictive. Also, the reference or non-reference to a particular embodiment shall not be interpreted to limit the scope of protection.

The software application or cropping method of the electronic data processing unit proposed crops and manipulates image and PDF documents in freeform/irregular. The software application or cropping method is mainly used for the IOS® Platform (i.e., Apple® Operating System) and the Apple® devices thereof, but may also be used with other various operating systems as well. When using the software application or cropping method, the user may draw freeform-irregular boundaries around the cropped area using a finger or stylus pen, and the software preferably readjusts the boundaries of the cropped area, resulting with a tightly-fit rectangle around the desired freeform-irregular cropped area. Additionally, image or word data is reduplicated through transparent layers, which typically overlap the original image. The freeform-irregular cropped image may be copied, pasted, or imported into another document, thereby leaving the original file unaltered. The cropped portion of the image may also be sent or emailed by the user.

In the following description, certain terminology is used to describe certain features of one or more embodiments. For instance, the terms "computer" and "electronic data processing unit" refer to any device that processes information with an integrated circuit chip, including without limitation, mainframe computers, workstations, servers, desktop computers, portable computers, laptop computers, embedded computers, wireless devices including cellular phones, tablet computers, personal digital assistants, digital media players, portable game players, and hand-held computers. The term "mobile electronic device" refers to any mobile data processing device that processes information with an integrated circuit chip, including without limitation, portable computers, laptop computers, embedded computers, wireless devices including cellular phones, tablet computers, personal digital assistants, digital media players, portable game players, and hand-held computers. The terms "image", "transparency", "transparency image", and "image-transparency" refers to any one or more various transparent transparency/transparent image graphics file formats, including without limitation, transparency/image, transparent transparency, transparent image, full transparency (i.e. something that is completely invisible), partial transparency, and translucency. The terms "defining a cropped area" may be accomplished by any mechanism, including without limitation, a keyboard, mouse, soft key keypad, touchscreen, stylus, finger, or any touch/pressure device. The terms ""Image-Transparency-A" or "Image/Transparency-A" refers to an Image/Transparency which is either created by the user or copied by the user from some other location or an already existing image, of a document or a photograph or an image file. The term "Image/Transparency" refers to an image which could either be a .JPEG/.JPG (Joint Photographic Experts Group) image file or a .PNG (Portable Network Graphics) image file.

FIG. 1 is a block diagram of one embodiment of the computer-based method for cropping using transparency overlay system. As shown in FIG. 1, the computer-based method 100 for cropping preferably, comprises the steps of: providing an electronic data processing unit 103; displaying one or more applications on one or more display screens 106; creating a first transparent image-transparency with the one or more applications 109; creating an Image-Transparency-A of one or more files with the one or more applications 112; positioning the Image-Transparency-A above the first transparent image-transparency 115; processing the Image-Transparency-A and the first transparent image-transparency to create a processed image-transparency 118; creating a second transparent image-transparency 121; positioning the second transparent image above the first processed image-transparency 124; defining a cropped area on the second transparent image-transparency by a user 127; creating a second processed image-transparency 130; superimposing the second processed image-transparency above the processed image-transparency 133; creating a cropped portion on the processed image-transparency 136; creating a color contrast between cropped and un-cropped portions 137; calculating one or more boundaries of the cropped portion 139; and creating freeform cropped image-transparency 142. It should also be understood that the computer-based method 100 may also include other steps without deviating from the scope of protection.

FIG. 1 shows the first step of the computer-based method for cropping 100, which is to provide an electronic data processing unit 103. An electronic data processing unit is typically any general purpose device that can be programmed to carry out a finite set of arithmetic or logical operations. The electronic data processing unit typically comprises of a bus 203, processor 206, memory 209, mass storage device 212, and other I/O devices 224. The electronic data processing unit may also include one or more displays 221, a keyboard or keypad 215, and a pointing device 218. The electronic data processing unit may also include other components without deviating from the scope of protection. Preferably, the electronic data processing unit device 200 is a mobile computing device such as a tablet computer or cell phone, but may be any type of computing device.

FIG. 1 also shows the next step of one embodiment of the cropping method which is displaying one or more applications on one or more display screens 106. The one or more applications is preferably any one or a collection of software applications or related data that provides the directions for instructing the electronic data processing unit to perform a certain function (e.g., cropping application). The one or more applications preferably performs the cropping function of the software program by opening one or more files such as image and word files, and displaying such files in the one or more display screens in order to allow the user to readily define the cropping area.

FIG. 1 shows the third step of one embodiment of the cropping method, which is creating a first transparent image-transparency with the one or more applications 109. The first transparent image-transparency 306 (shown in FIG. 3), is preferably a plurality of pixels that shows an image superimposed by the pixels as if no intervening material existed. The first transparent image-transparency 306 is preferably transparent, but may be reflective of other shades of color such as white or any light colored background. The first transparent image-transparency 306 also may or may not be visible to the user and may be of any shape or size. The creation of the first transparent image-transparency 306 may also be dependent upon the device type (e.g., tablet computer, cell phone, smartphone, or desktop computer), the display type (e.g., Retina® or non-Retina®), and/or the type of operating system of the electronic data processing unit 200 (or more specifically, which IOS® Platform Version (also referred to as IOS® version) (e.g., IOS® 4, IOS® 5, IOS® 7, or IOS® 8).

FIG. 1 shows the next step of the computer-based method 100, which is creating an Image-Transparency-A of one or more files with the one or more applications 112. The Image-Transparency-A 409 is preferably a duplicate image or PDF document file that will be used for cropping. The Image-Transparency-A 409 may be copied from any file location or application in the electronic data processing unit such as a photo album, email, internet website, or any other software applications and may also be copied and pasted to the cropping application. The Image-Transparency-A 409 may be created by the cropping application.

Figure 13:
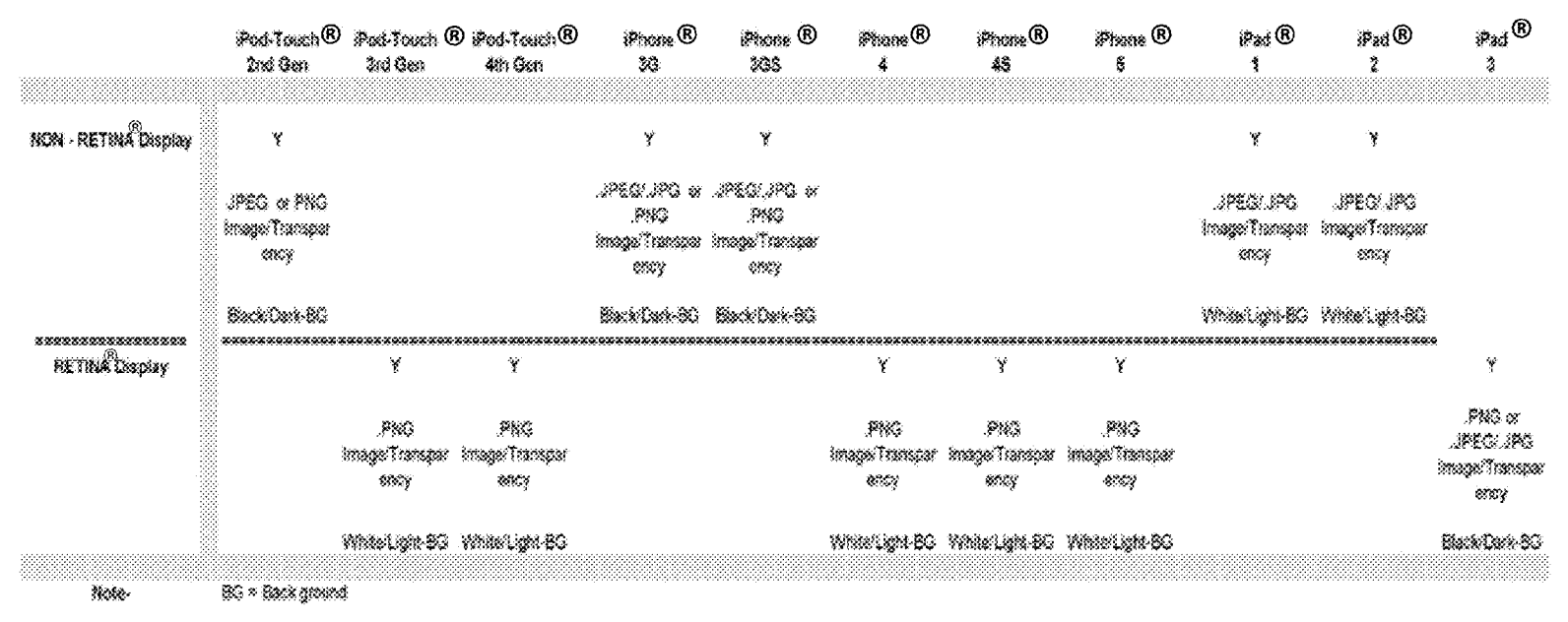

The fifth and sixth steps of one embodiment of the computer-based method 100 preferably involve creating a processed image—i.e., specifically, positioning the Image-Transparency-A above the first transparent image-transparency 115 and processing the Image-Transparency-A and the first transparent image-transparency to create a first processed image-transparency 118. Specifically, the cropping application typically positions the image 409 above the first transparent image-transparency 306. After placing the Image-Transparency-A 409 above the transparent layer 306, the cropping application creates the first processed image-transparency 603. Creating the first processed image-transparency 603 may also depend upon a number of factors such as the device type (e.g., tablet computer, cell phone, smartphone, or desktop computer), the display type (e.g., Retina® or non-Retina®), and/or the type of operating system of the electronic data processing unit 200. The table showing the type of image to be created is shown in FIG. 13.

FIG. 1 shows the seventh and eighth steps of one embodiment of the computer-based method 100—creating a second transparent image-transparency 121 and positioning the second transparent image-transparency above the first processed image-transparency 124. Similar to the first transparent image-transparency 306, the cropping application preferably creates the second transparent image-transparency 706, which is typically a plurality of pixels that shows an image superimposed by the pixels as if no intervening material existed. The second transparent image-transparency 706 is typically transparent, but may comprise other shades of color such as white or any light colored background. The second transparent image-transparency 706 also may or may not be visible to the user and may be of any shape or size. The creation of the second transparent image-transparency 706 may also be dependent upon the device type, display type, image format, image display size, and/or the type of operating system of the electronic data processing unit 200. The image display size may refer to the resolution of image(s) or measure of the sharpness/density of illuminated points on a display screen such as the dots per inch (DPI) of a file such as an image, picture, and/or document. The operating system type may refer to the type of program or software application that manages all the other programs in the device, including without limitation the Apple® IOS® operating systems (e.g., IOS® 7).

FIG. 1 shows the ninth step of one embodiment of the computer-based method 100—defining a cropped area on the second transparent image-transparency by a user 127. The cropped area 903 is generally the area, in which the user desires to crop or edit. The user may define the cropped area 903 by creating a freeform line, which encircles, envelops, or surrounds the cropped area 903. Specifically, the user may touch the cropping application at a starting point 906 and may use a finger or stylus pen to continuously move the finger or stylus pen in an irregular or freeform shape. Once the user lifts up his or her finger or stylus pen at an endpoint 909, the cropped area 903 is usually created. If the freeform line, however, does not intersect itself to create an enclosed shape or form, the freeform line preferably "closes" when starting point 906 connects to endpoint 909 through the use of an interconnection of a straight or irregular line. The freeform line of the user's continuous touching is typically shown, but may be invisible to the user. The cropped area 903 may be identified by dashes and/or solid lines and may be identified through the use of color schemes such as red, orange, yellow, green, blue, indigo, violet, or any other. Preferably, only the second transparent image-transparency 706 is cropped by the user.

FIG. 1 also shows the tenth step of one embodiment of the computer-based method 100—i.e., creating a second processed image-transparency 130. Preferably, the cropping application creates the second processed image-transparency 1001, 1002 which is typically derived from the second transparent image-transparency 706 and generally includes a cropped portion and an un-cropped portion. The cropped portion is preferably identified as entirely black (or any other dark color), whereas the un-cropped area of the second processed image as mentioned in the step—creating a color contrast between cropped and un-cropped portions 137-, and second processed image-transparency 1001 remains entirely white (or any other light color or transparent), or vice-versa. The cropped portion is preferably identified as entirely white (or any other light color), whereas the un-cropped area of the second processed image mentioned in the step—creating a color contrast between cropped and un-cropped portions 137-, and second processed image-transparency 1002 remains entirely black (or any other dark color). However, it should be understood that the embodiments may identify the cropped and un-cropped area as the vice versa—i.e., the un-cropped portion may be entirely black or any dark color while the cropped area may remain entirely white, a light color, transparent, or checkered or vice-versa. The table or matrix showing the light and dark (or white and black) color contrasts to be created is shown in FIG. 13.

FIG. 1 shows the remaining steps of one embodiment of the computer-based method 100—superimposing the second processed image-transparency above the first processed image-transparency 133; creating a cropped portion on the first processed image-transparency 136; creating a color contrast between cropped and un-cropped portions 137; calculating one or more boundaries of the cropped portion 139; and creating a freeform cropped image-transparency 142. The second processed image-transparency 1001, 1002 is preferably above the first processed image-transparency 603 to assist the cropping application to select the cropped area. Specifically, the cropped area in the first processed image-transparency 603 is typically used to calculate the boundaries of the freeform cropped image 1203, which is preferably a tight-fit rectangular box that encloses the cropped portion. The freeform cropped image 1203 is preferably based upon the x-coordinate and y-coordinate and width and height. Once the freeform cropped image 1203 is calculated/created, the user may perform other various functions on the freeform cropped image 1203 (e.g., create either a .JPEG/.JPG or .PNG file format, copy and paste the freeform cropped image 1203, send the freeform cropped image 1203 by email, or save the freeform cropped image 1203 for later editing).

Figure 2:
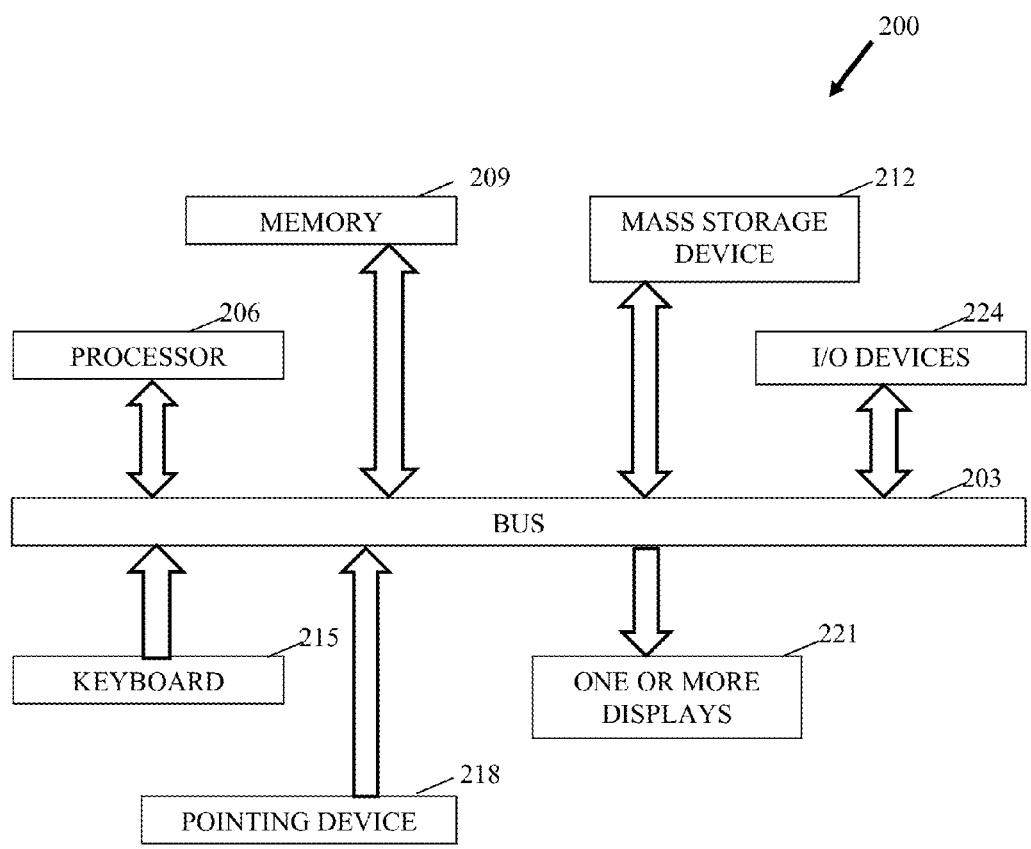
FIG. 2 is a block diagram of one embodiment of an electronic data processing unit that utilizes the computer-based method of cropping using transparency overlay system.

FIG. 2 is a block diagram of one embodiment of an electronic data processing unit that utilizes the computer-based method of cropping using transparency overlay system. As shown in FIG. 2, the electronic data processing unit 200 preferably includes: a bus 203; processor 206; memory 209; mass storage device 212; keyboard 215, pointing device 218, display 221, and other I/O devices 224. The electronic data processing unit 200 may also include other components without deviating from the scope of protection.

Preferably, the bus 203 is one or more connections of electrical wires or contacts for transferring data and/or other information. The bus 203 may function internally, which typically connects all internal components of the electronic data processing unit 200 (e.g., connecting the processor, memory, and motherboard) or externally, which typically connects all different external devices (e.g., monitors, printers, etc. . . . ).

The processor 206 may be any known or commercially available processor or microprocessor, which incorporates the electronic data processing unit's 200 central processing unit (CPU). The processor 206 preferably accepts digital data as input and processes, according to instructions stored in its memory 209, and preferably provide results as output. The general-purpose of the processor 206 is for photo editing/image cropping but may also be used for computation, text editing, multimedia display, etc. . . . The processor 206 may also be used for other purposes without deviating from the scope of protection.

Preferably, memory 209 is also provided in the electronic data processing unit 200, which is typically any physical device that is connected to the bus 203 and typically stores information and instructions to be executed by the processor 206. The memory 209 may be volatile and nonvolatile memory. Volatile memory typically requires power to retain the stored information and may include random access memory (RAM), dynamic random access memory (DRAM), and CPU cache memory. Non-volatile memory typically retains the saved information even when the electronic data processing unit 200 is not powered and typically includes flash memory, read only memory (ROM), programmable read only memory (PROM), erasable programmable read only memory (EPROM), and electrically erasable programmable read-only memory (EEPROM). It should be understood, however, that the present embodiments may include other types of memory.

The electronic data processing unit 200 preferably includes a mass storage device 212, which is generally connected to the bus 203. The mass storage device 212 is typically a device for storing and receiving digital information, primarily computer data and application programs. The mass storage device 212 is preferably an internal hard disk drive but may also be other devices, including without limitation: external hard drives, external optical drives such as CD and DVD drives, portable flash memory devices, solid-state drives, adapters bridging between standard flash memory cards and universal serial bus (USB) connections, card readers, and other external devices such as digital cameras, digital audio players/portable media players, personal digital assistants (PDAs), and mobile phones. Generally, the mass storage device 212 stores system and application programs; wherein the programs are executed by the processor 206 and are typically downloaded to the memory 209 before being executed by the processor 206.

The one or more display screens 22 are typically coupled to the front face of the electronic data processer 200 and typically convey electronic information to the user. The one or more display screens 22 is generally coupled to the bus 203 for displaying information to a user of the computer system. The keyboard 215 or keypad input device may also be provided, which is typically connected to the bus 203. A pointing device 218 of the computer system is preferably any stylus pen, finger, or pointer for manually cropping an image in freeform, but may also be any cursor controlled device such as a mouse, trackball, trackpad, or cursor direction key. The pointing device 218 is also preferably connected to the bus 203 for communicating direction information and command selections to the processor and for controlling cursor movement on the one or more displays 221.

The computer system may also include other I/O devices 224 (i.e., input/output devices), which are peripheral devices, including without limitation, scanners, copiers, external hard drives, CD-ROM drives, DVD-ROM drives, web cameras, flash drives, disk drives, smartphones, table computers, keyboards, computer mice, touchscreens, image scanners, and other display devices. Additionally, the electronic data processing unit 200 may function with or without some of the above devices without deviating from the scope of protection.

Figure 3:
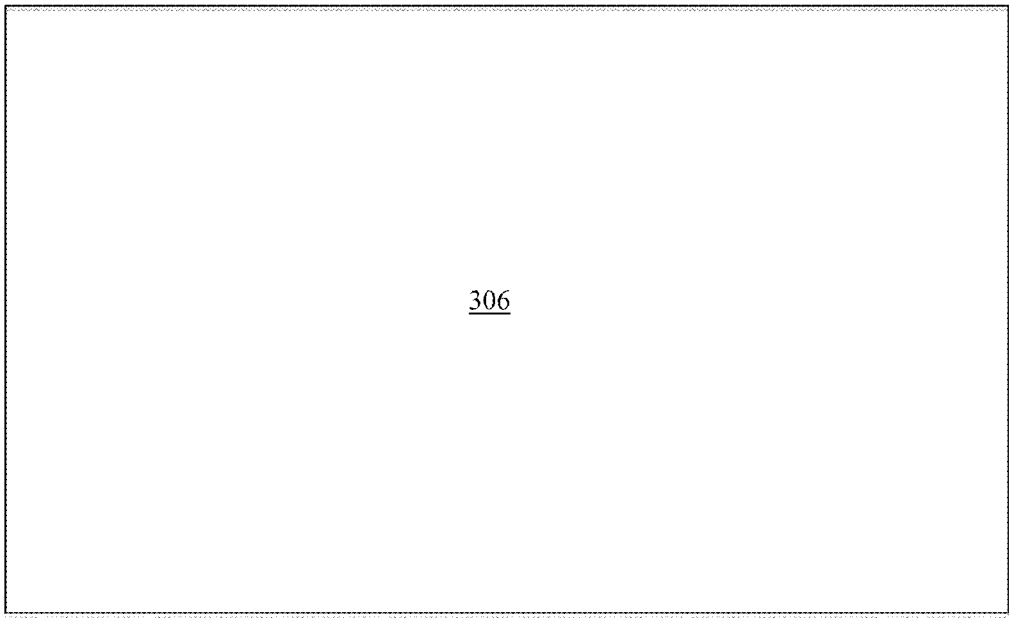
FIG. 3 is an illustration of one embodiment of the computer-based method for cropping using transparency overlay system and shows a first transparent image-transparency.

FIG. 3 is an illustration of one embodiment of the computer-based method for cropping using transparency overlay system and shows a first transparent image-transparency. As discussed above, a first transparent image-transparency 306 is preferably a plurality of pixels that shows an image superimposed by the plurality of pixels as if no intervening material existed. The first transparent image-transparency 306 is preferably transparent, but may be reflective of other shades of color such as white or any light colored background. The first transparent image-transparency 306 also may or may not be visible to the user and may be of any shape or size. The creation of the first transparent image-transparency 306 may also be dependent upon the device type (e.g., tablet computer, cell phone, smartphone, or desktop computer), the display type (e.g., Retina® or non-Retina®), and/or the type of operating system of the electronic data processing unit 200.

Figure 4:
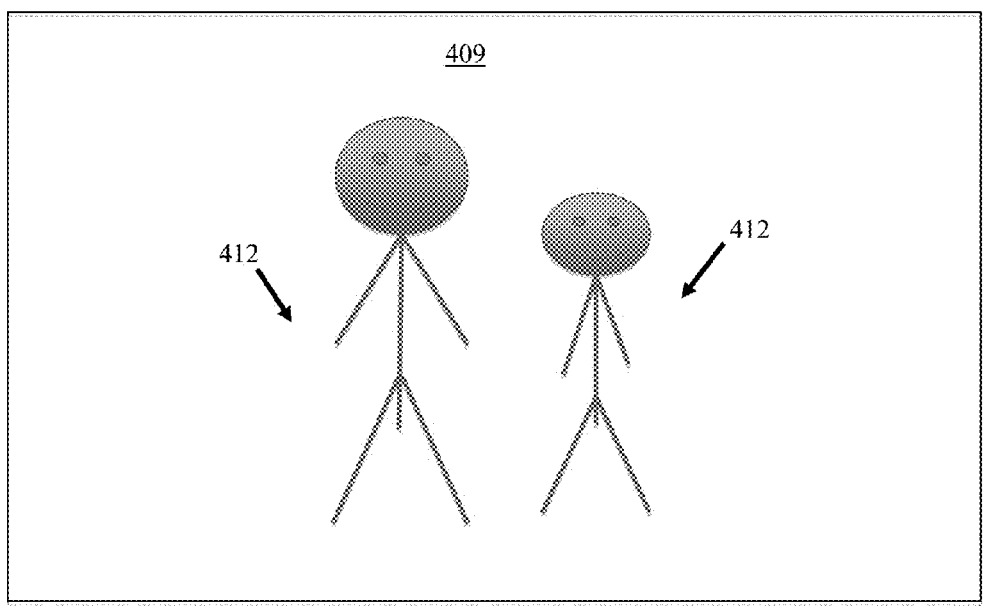
FIG. 4 is an illustration of one embodiment of the computer-based method for cropping using transparency overlay system and shows an Image-Transparency-A.

FIG. 4 is an illustration of one embodiment of the computer-based method for cropping using transparency overlay system and shows an Image-Transparency-A. As discussed above, the Image-Transparency-A 409 is preferably a duplicate image or PDF document file that will be subject to cropping and may include one or more figures 412. The Image-Transparency-A 409 may be transferred or copied from any file location or application in the electronic data processing unit such as a photo album, email, internet website, or any other software applications and may also be copied and pasted to the cropping application. Preferably, the Image-Transparency-A 409 is created by the cropping application.

Figure 5:
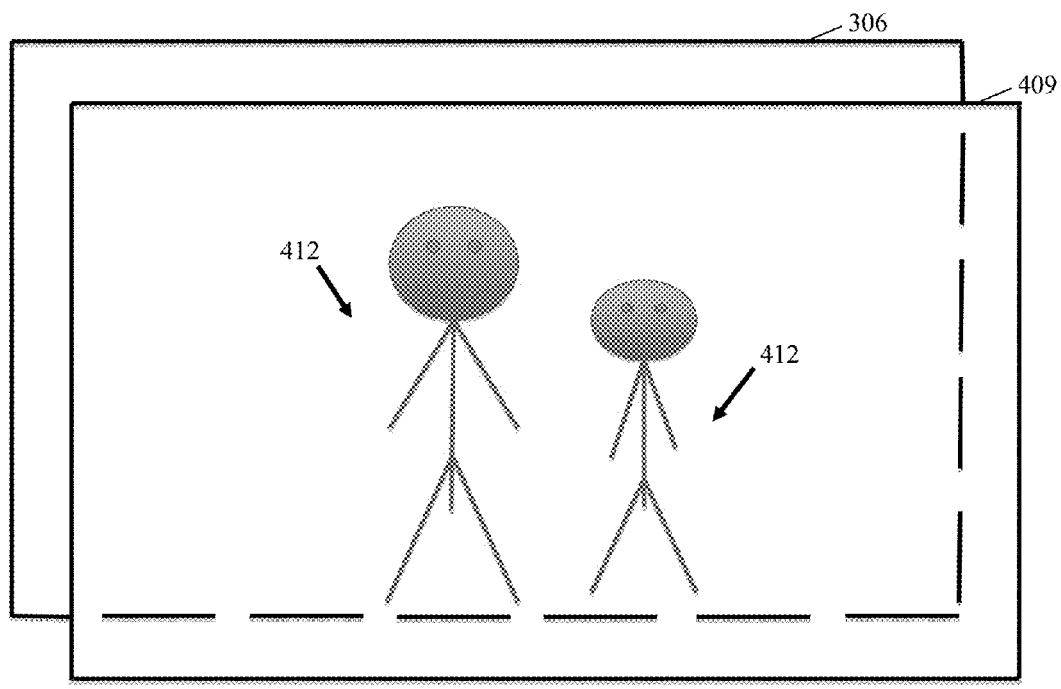
FIG. 5 is an illustration of one embodiment of the computer-based method for cropping using transparency overlay system and shows the Image-Transparency-A positioned above the first transparent image-transparency.

FIG. 5 is an illustration of one embodiment of the computer-based method for cropping using transparency overlay system and shows an Image-Transparency-A positioned above the first transparent image-transparency. As shown in FIG. 5, the computer-based method 100 preferably includes a first transparent image-transparency 306 and an image 409. The image 409 may include one or more figures 412 and is typically positioned above the first transparent image-transparency 306. The first transparent image-transparency 306 is typically a plurality of pixels that projects an image which is superimposed by the pixels, and image 409 is typically an image or word file that will be subject to cropping.

Figure 6:
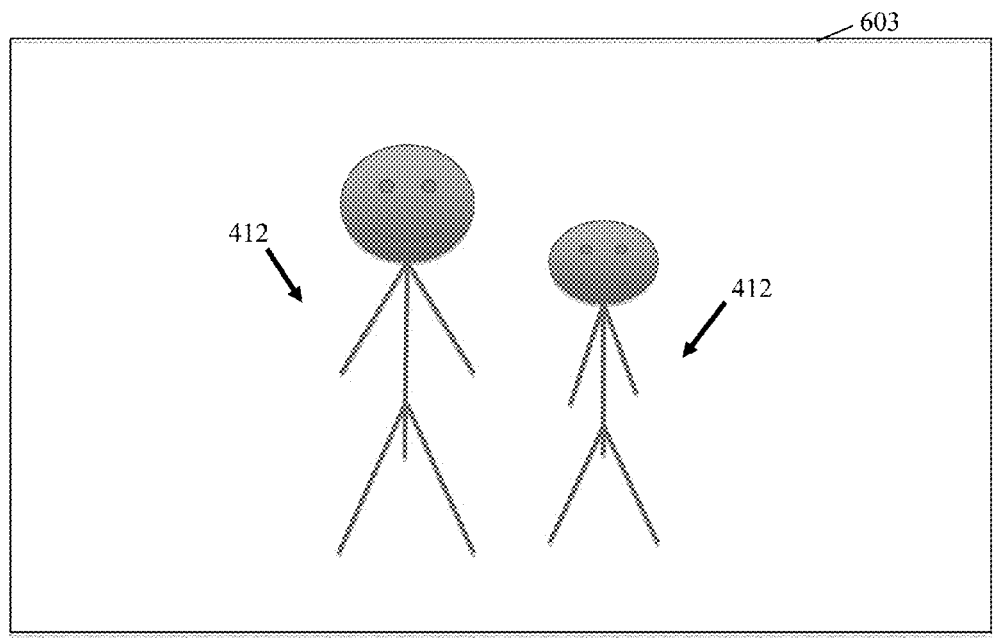
FIG. 6 is an illustration of one embodiment of the computer-based method for cropping using transparency overlay system and shows a processed image-transparency.

FIG. 6 is an illustration of one embodiment of the computer-based method for cropping using transparency overlay system and shows a processed image-transparency. As shown in FIG. 6, the computer-based method 100 preferably includes a processed image-transparency 603. The processed image-transparency 603 may include one or more figures 412. Preferably, the processed image is created by a combination of the first transparent image-transparency 306 and an image 409, and may involve the use of an algorithm, which may depend upon a number of factors such as the device type (e.g., tablet computer, cell phone, smartphone, or desktop computer), display type (e.g., Retina® or non-Retina®), and/or type of operating system. The table or matrix showing the type of image and color contrasts to be created during the cropping process is shown in FIG. 13.

Figure 7:
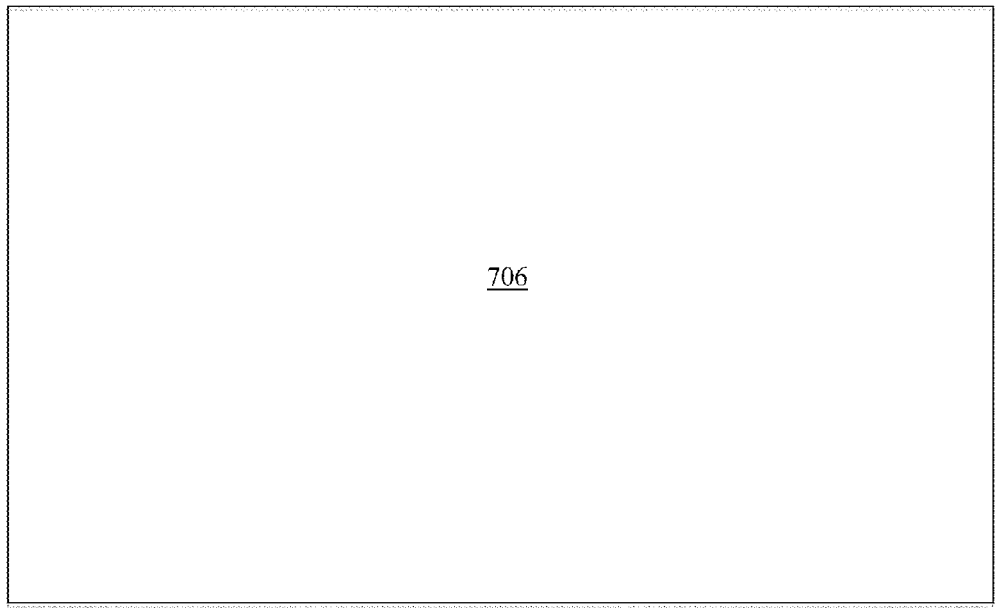
FIG. 7 is an illustration of one embodiment of the computer-based method for cropping using transparency overlay system and shows a second transparent image-transparency.

FIG. 7 is an illustration of one embodiment of the computer-based method for cropping using transparency overlay system and shows a second transparent image-transparency. Like the first transparent image-transparency 306, the second transparent image-transparency 706 is preferably a plurality of pixels that projects an image superimposed by the plurality of pixels. The second transparent image-transparency 706 is preferably transparent, but may be reflective of other shades of color such as white or any light colored background. The second transparent image-transparency 706 also may or may not be visible to the user and may be of any shape or size. The creation of the second transparent image-transparency 706 may also depend upon a number of factors such as: device type (e.g., tablet computer, cell phone, smartphone, or desktop computer), display type (e.g., Retina® or non-Retina®), and/or type of operating system of the electronic data processing unit 200. The table or matrix showing the type of image and color contrasts to be created during the cropping process is shown in FIG. 13.

Figure 8:
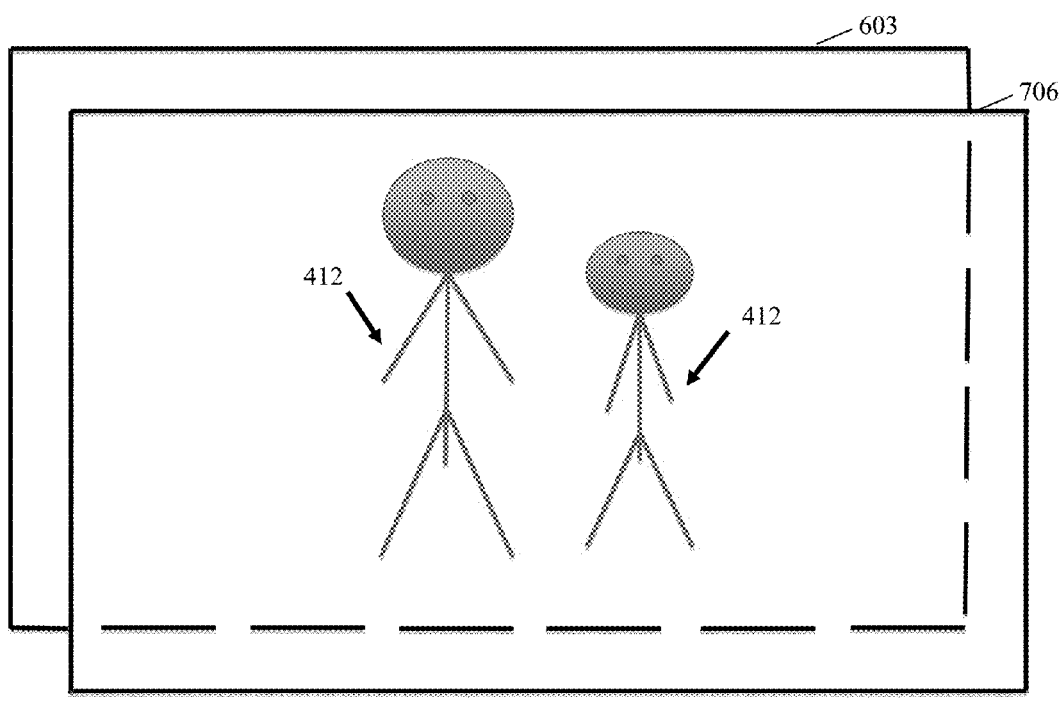
FIG. 8 is an illustration of one embodiment of the computer-based method for cropping using transparency overlay system and shows the second transparent image-transparency positioned above the processed image-transparency.

FIG. 8 is an illustration of one embodiment of the computer-based method for cropping using transparency overlay system and shows the second transparent image-transparency positioned above the processed image-transparency. As shown in FIG. 8, the computer-based method 100 preferably includes a first processed image-transparency 603 and a second transparent image-transparency 706. The first processed image-transparency 603 may include one or more figures 412. The second transparent image-transparency 706, as discussed above, is preferably a plurality of pixels that projects an image superimposed by the plurality of pixels. The first processed image-transparency is typically created by a combination of the first transparent image-transparency 306 and an image 409, and may involve the use of an algorithm, which may depend upon certain factors such as the device type (e.g., tablet computer, cell phone, smartphone, or desktop computer), display type (e.g., Retina® or non-Retina®), and/or type of operating system. The table or matrix showing the type of image and color contrasts to be created during the cropping process is shown in FIG. 13.

Figure 9:
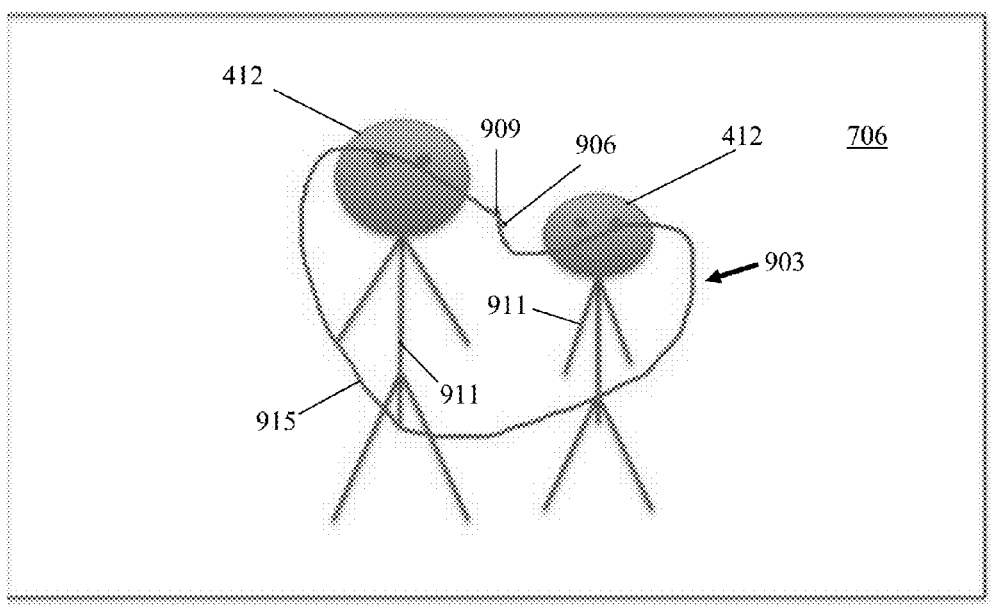
FIG. 9 is an illustration of one embodiment of the computer-based method for cropping using transparency overlay system and shows a cropped area.

FIG. 9 is an illustration of one embodiment of the computer-based method for cropping using transparency overlay system and shows a cropped area. As shown in FIG. 9, the computer-based method 100 preferably includes a cropped area 903, starting point 906, endpoint 909, and second transparent image-transparency 706. Preferably, the second transparent image-transparency 706 is positioned above first processed image-transparency 603, such that one or more figure 412 is projected through second transparent image-transparency 706. The cropped area 903 is preferably the area, in which the user desires to crop, and is preferably performed on the second transparent image-transparency 706 rather than the first processed image-transparency 603. However, the present embodiments allow the user to crop the first processed image-transparency 603 rather than the second transparent image-transparency 706.

As shown in FIG. 9, a starting point 906 is typically created when a user initially touches the cropping application with a stylus pen or finger. When the user touches the cropping application, the user typically continuously move his or her finger/stylus pen in an irregular or freeform shape. Once the user lifts up his or her finger or stylus pen, an endpoint 909 is preferably created to form the cropped area 903, which may include portions of the figure 911. A freeform line 915 due to the user's continuous touching is preferably shown. If the freeform line 915 does not intersect itself to create the enclosed shape or form, starting point 906 preferably connects to endpoint 909 with an additional straight or irregular line. The freeform line 915 may be identified by dashes and/or solid lines and also may be identified through the use of color schemes such as red, orange, yellow, green, blue, indigo, violet, or any other color.

Figure 10:
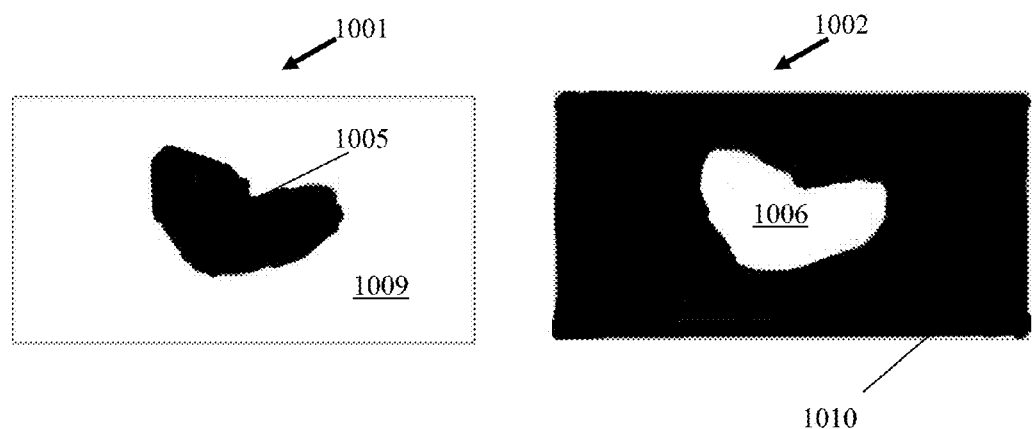
FIG. 10 is an illustration of two embodiments of the computer-based method for cropping using transparency overlay system and shows the second processed image-transparency with a cropped portion and an un-cropped portion. The cropped portion and the un-cropped portion typically contrast in one or more colors such as dark and light or black and white.

FIG. 10 is an illustration of two embodiments of the computer-based method for cropping using transparency overlay system and shows the second processed image-transparency with a cropped portion and an un-cropped portion. The cropped portion and the un-cropped portion typically contrast in one or more colors such as dark and light or black and white. As shown in FIG. 10, the computer-based method 100 preferably includes a second processed image-transparency 1001, 1002. The second processed image-transparency 1001, 1002 is preferably created by the cropping application, which is typically based upon the cropped second transparent image-transparency 706, which is shown in FIG. 9. The second processed image-transparency 1001, 1002 typically comprises a first cropped portion 1005, 1006 and a first un-cropped portion 1009, 1010. Preferably, the second processed image-transparency 1001, 1002 is superimposed or positioned above the first processed image-transparency 603 and is used to define the freeform cropped image 1201 (shown in FIG. 12). The first cropped portion 1005 may be made entirely black (or any other dark color), while the first un-cropped area 1009 of the second processed image 1001 may remain entirely white or light colored or transparent. Alternatively, the second processed image-transparency 1002 may have an the first un-cropped portion 1010 that is entirely black or any other dark color and may have a first cropped portion 1006 that remains entirely white, light background color, or entirely transparent. While FIG. 10 shows the second processed image-transparency 1001, 1002 as black and white, it should be understood that the present embodiments allow any type of color without deviating from the scope of protection.

Figure 11:
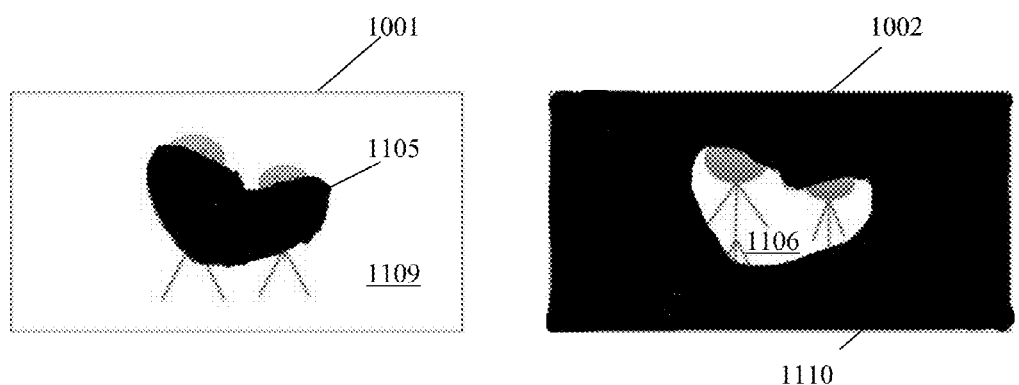
FIG. 11 is an illustration of two embodiments of the computer-based method for cropping using transparency overlay system and shows the second processed image-transparency positioned above the processed image-transparency.

FIG. 11 is an illustration of two embodiments of the computer-based method for cropping using transparency overlay system and shows the second processed image-transparency positioned above the processed image-transparency. As shown in FIG. 11, the computer-based method 100 preferably includes shows the second processed image-transparency 1001, 1002 positioned above the first processed image-transparency 603. The second processed image-transparency preferably includes a second cropped portion 1105, 1106 and a second un-cropped portion 1109, 1110. The second cropped portion 1105 may include portions of a figure. The second un-cropped portion may also include portions of the figure. Both the second cropped portion 1105, 1106 and second un-cropped portion 1109, 1110 preferably contrasts in one or more colors. While FIG. 10 shows the second cropped portion and second un-cropped portion contrast between black and white or dark and light, it should be understood that the present embodiments allow any type of color without deviating from the scope of protection.

Figure 12:
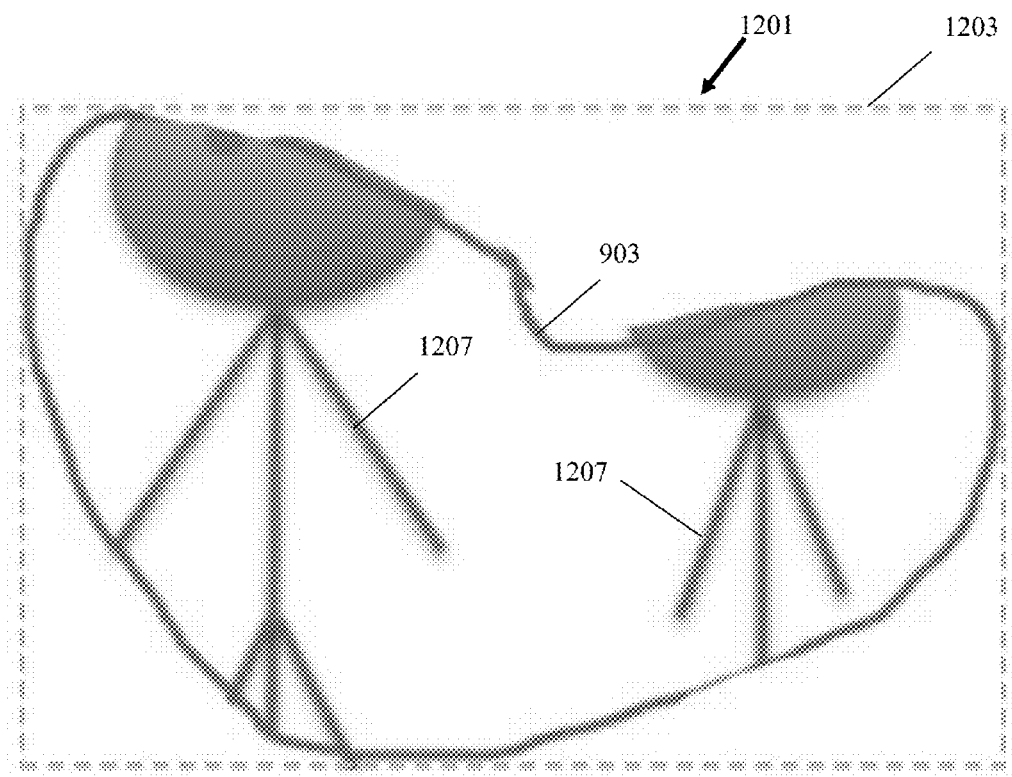
FIG. 12 is an illustration of one embodiment of the computer-based method for cropping using transparency overlay system and shows a freeform cropped image-transparency.

FIG. 12 is an illustration of one embodiment of the computer-based method for cropping using transparency overlay system and shows a freeform cropped image-transparency. The freeform cropped image-transparency 1201 is preferably the resulting cropped product, which includes a tight-fit rectangular box 1203 that encloses the cropped portion 903. The freeform cropped image-transparency 1201 is typically based upon the x-coordinate and y-coordinate and width and height of the cropped portion 903. The cropped portion 903 may include portions of one or more figure 1207. The freeform cropped image 901 may be used for copying and pasting the freeform cropped image-transparency 1201, sending the freeform cropped image-transparency 1201 by email, or saving the freeform cropped image-transparency 1201 for later editing.

FIG. 13 is a table of one matrix of one embodiment of the computer-based method for cropping using transparency overlay system and shows how to fill the cropped area in relation to the device type, and display type; and also details which image format type is to be made during processing and saving of the image-transparency during the freeform-irregular cropping process. Specifically, FIG. 13 shows whether the background should be a Black/Dark color or White/Light/Transparent color, when: (1) the device type is an iPad®, iPod-Touch®, or iPhone®; (2) the display type should be a Retina® or non-Retina® display; and (3) image format type should be a .JPEG, .JPG, or .PNG. For example, a second generation iPod-Touch® for a non-Retina® display with either a .JPEG or .PNG Image/Transparency would utilize a Black/Dark background. On the other hand, an iPhone 4S for a Retina® display with a .PNG Image/Transparency would utilize a White/Light background.

FIG. 14 is another table of a matrix of one embodiment of the computer-based method for cropping using transparency overlay system for an Apple® iPod® and shows how to fill the cropped area in relation to the device type, IOS® version, and display type for the iPod®; and also details which image resolution and shape is to be made during processing and saving of the image-transparency during the freeform-irregular cropping process. Specifically, FIG. 14 shows whether the background should be a Black/Dark color or White/Light, when: (1) the device type is a 2nd generation, 3rd generation, 4th generation, or 5th generation iPod-Touch®; (2) the display type should be a Retina® or non-Retina® display; (3) image resolution in dots per inch (DPI) should be a low DPI or High DPI; (4) image shape should be freeform, circle-shaped, or box-shaped; and (5) the IOS® Version is less than seven (7) or is greater than or equal to seven (7). For example, a second generation iPod-Touch® for a non-Retina® display with a low DPI and freeform shape would utilize a Black/Dark background. On the other hand, a 4th generation iPod-Touch® with an IOS® less than 7, for a Retina® display with a high DPI and circle shape, would utilize a White/Light background.

Figure 15:
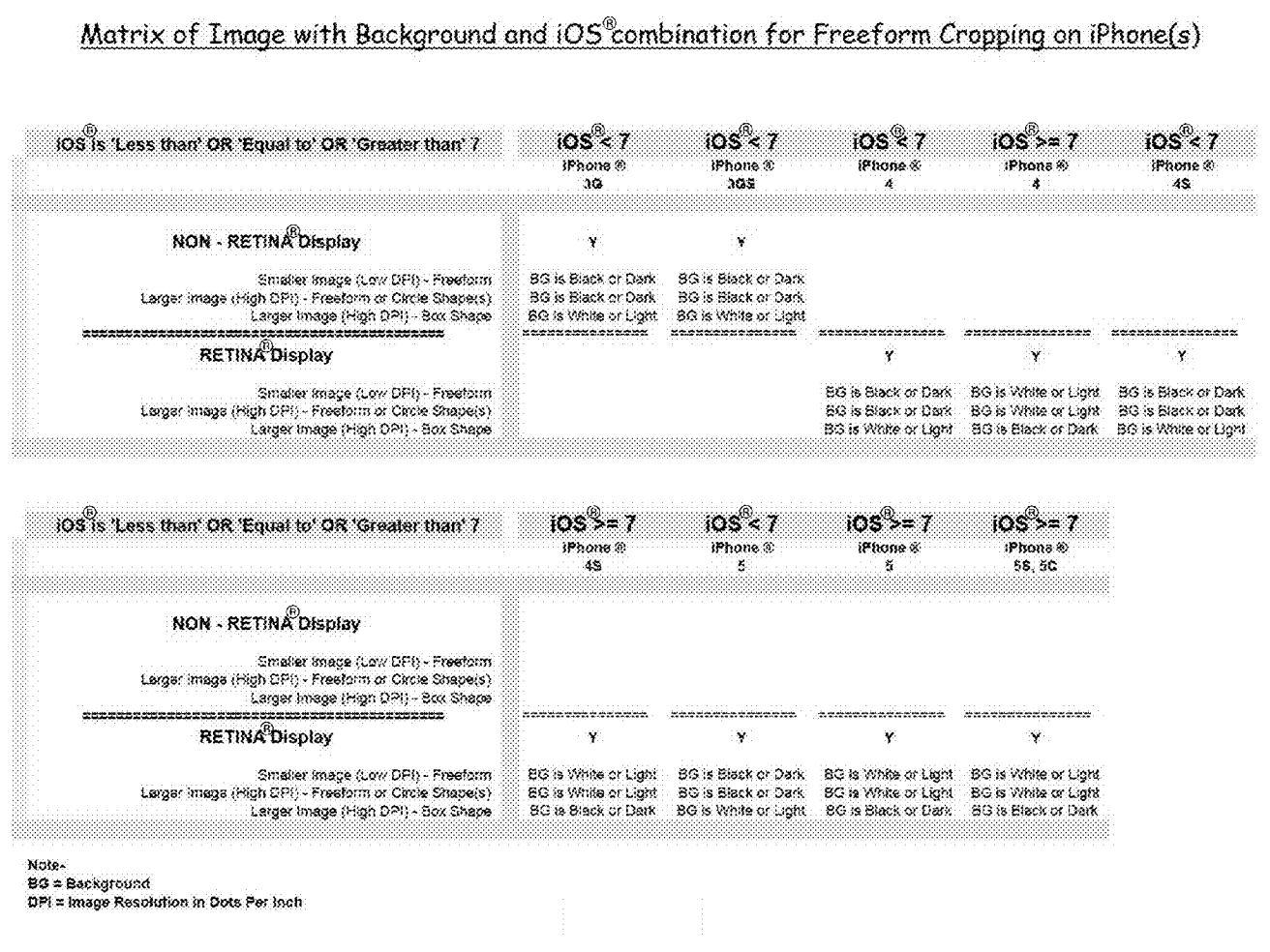

FIG. 15 is another table of a matrix of one embodiment of the computer-based method for cropping using transparency overlay system for an Apple® iPhone® and shows how to fill the cropped area in relation to the device type, IOS® version, and display type for the iPhone®; and also details which image resolution and shape is to be made during processing and saving of the image-transparency during the freeform-irregular cropping process. Specifically, FIG. 15 shows whether the background should be a Black/Dark color or White/Light color, when: (1) the device type is an iPhone® 3G, iPhone® 3GS, iPhone® 4, iPhone® 4S, iPhone® 5, iPhone® 5S, or iPhone® 5C; (2) the display type should be a Retina® or non-Retina® display; (3) image resolution in DPI should be a low DPI or High DPI; (4) image shape should be freeform, circle-shaped, or box-shaped; and (5) the IOS® Version is less than seven (7) or is greater than or equal to seven (7). For example, an iPhone® 3G with IOS® less than 7, for a non-Retina® display with a low DPI and freeform shape, would utilize a Black/Dark background. On the other hand, an iPhone® 5S with IOS® greater than or equal to 7, for a Retina® display with a low DPI and freeform shape would, utilize a White/Light background.

Figure 16:
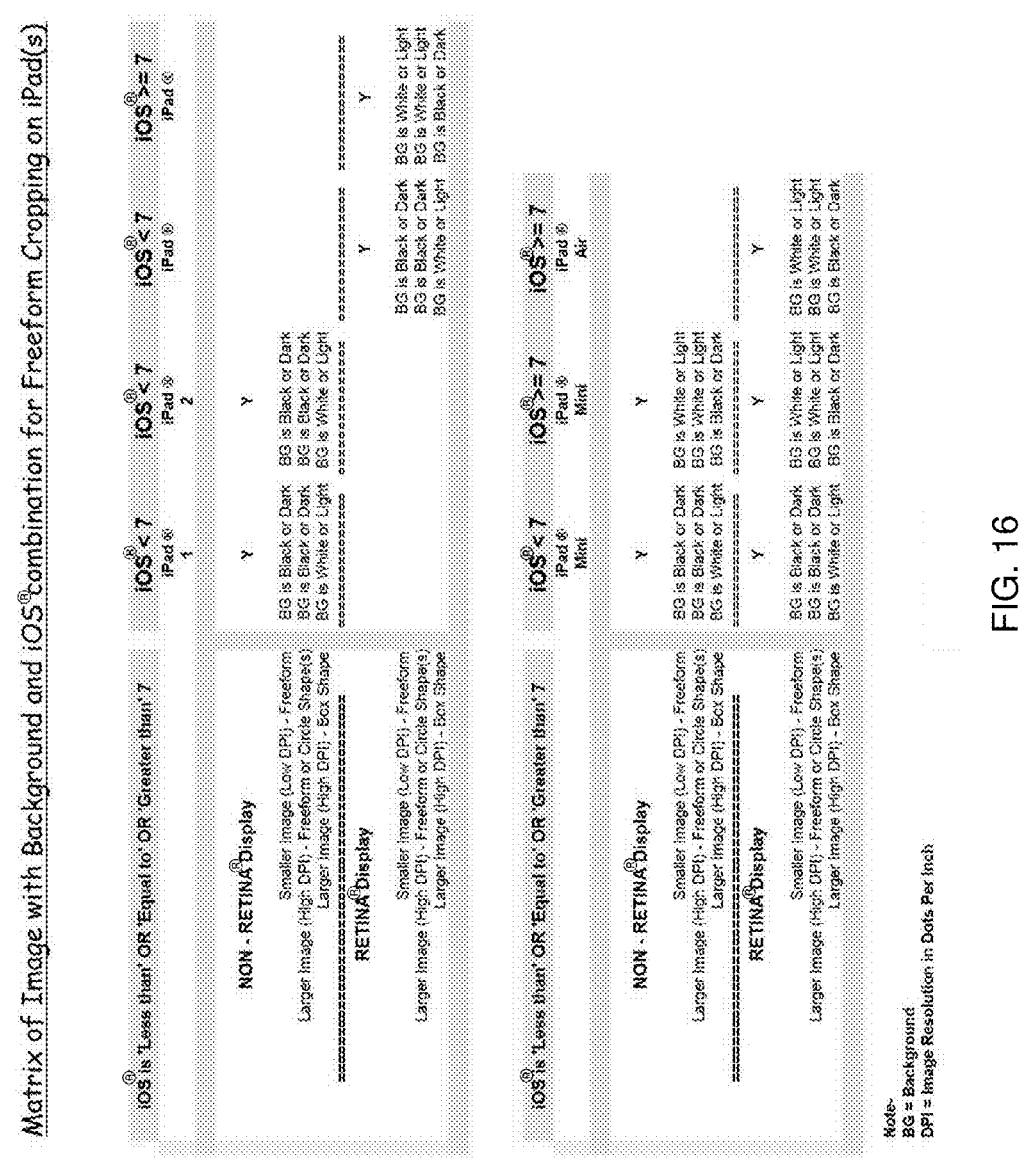

FIG. 16 is another table of a matrix of one embodiment of the computer-based method for cropping using transparency overlay system for an Apple® iPad® and shows how to fill the cropped area in relation to the device type, IOS® version, and display type for the iPad®; and also details which image resolution and shape is to be made during processing and saving of the image-transparency during the freeform-irregular cropping process. Specifically, FIG. 16 shows whether the background should be a Black/Dark color or White/Light color, when: (1) the device type is a first generation iPad®, second generation iPad®, iPad® Mini, or iPad® Air; (2) the display type should be a Retina® or non-Retina®; (3) image resolution in DPI should be a low DPI or High DPI; (4) image shape should be freeform, circle-shaped, or box-shaped; and (5) the IOS® Version is less than seven (7) or is greater than or equal to seven (7). For example, an iPad® 2 with IOS® less than 7, with an for a non-Retina® display with a low DPI and freeform shape would utilize a Black/Dark background. On the other hand, an iPad® Mini with IOS® greater than or equal to 7, for a non-Retina® display with a low DPI and freeform shape, would utilize a White/Light background.

Unless otherwise stated, all measurements, values, ratings, positions, magnitudes, sizes, locations, and other specifications which are set forth in this specification, including in the claims which follow, are approximate, not exact. They are intended to have a reasonable range which is consistent with the functions to which they relate and with what is customary in the art to which they pertain.

The foregoing description of the preferred embodiments have been presented for the purposes of illustration and description. While multiple embodiments are disclosed, still other embodiments will become apparent to those skilled in the art from the above detailed description, which show and describe illustrative embodiments. As will be realized, the embodiments are capable of modifications in various obvious aspects, all without departing from the spirit and scope of the present disclosure. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

Except as stated immediately above, nothing which has been stated or illustrated is intended or should be interpreted to cause a dedication of any component, step, feature, object, benefit, advantage, or equivalent to the public, regardless of whether it is or is not recited in the claims.

What is claimed is:

1. A computer-based method for freeform-irregular cropping of images, the steps comprising:
   providing an electronic data processing unit;
   wherein said electronic data processing unit comprises: one or more display screens, one or more applications, and one or more files;
   displaying said one or more applications on said one or more display screens;
   creating a first transparent image-transparency with said one or more applications;
   creating an Image-Transparency-A of said one or more files with said one or more applications;
   positioning said Image-Transparency-A above said first transparent image-transparency to create a combined Image-Transparency-A and first transparent image-transparency;
   processing said combined Image-Transparency-A and said first transparent image-transparency to create a first processed image-transparency;
   creating a second transparent image-transparency;
   positioning said second transparent image-transparency above said first processed image-transparency;
   defining a cropped area on said second transparent image-transparency by a user;
   creating a second processed image-transparency;
   wherein said second processed image-transparency comprises a first cropped portion and a first un-cropped portion;
   wherein said first cropped portion is defined by said cropped area;
   superimposing said second processed image-transparency above said first processed image-transparency;
   creating a second cropped portion on said first processed image-transparency by using said first cropped portion of said second processed image-transparency;

calculating one or more boundaries of said second cropped portion;

creating a freeform-irregular cropped image-transparency; and filling said cropped area based upon a device type.

2. The computer-based method of claim 1, wherein the step of filling said cropped area is further based upon an IOS® version.

3. The computer-based method of claim 1, wherein the step of filling said cropped area is further based upon a display type.

4. The computer-based method of claim 1, wherein the step of filling said cropped area is further based upon an image display size.

5. The computer-based method of claim 1, wherein the step of filling said cropped area is further based upon an IOS® version, a display type, and an image display size.

6. The computer-based method of claim 5, wherein said freeform-irregular cropped image-transparency comprises a box encapsulating said cropped area.

7. The computer-based method of claim 6, wherein said defining of said cropped area step is performed in freeform by said user.

8. The computer-based method of claim 7, wherein said defining of said cropped area step further comprises the steps of:

creating a freeform-irregular line;

wherein said freeform-irregular line is made by continuously contacting a surface of said one or more displays from a starting point to an endpoint; and enclosing said freeform-irregular line by connecting said starting point and said endpoint, with a substantially straight line, if said starting point and said endpoint are not connected by said user.

9. The computer-based method of claim 8, wherein said first cropped portion and said first un-cropped portion contrast in one or more colors.

10. The computer-based method of claim 9, wherein said data processing unit is a mobile electronic device.

11. The computer-based method of claim 5, the steps further comprising:

copying said freeform-irregular cropped image-transparency; and pasting said freeform-irregular cropped image-transparency into one or more documents.

12. The computer-based method of claim 11, the steps further comprising:

copying said freeform cropped image; and pasting said freeform cropped image into one or more documents.

13. The computer-based method of claim 12, the steps further comprising:

sending electronically said freeform cropped image to a second electronic data processing unit.

14. The computer-based method of claim 13, wherein said one or more files are one or more image files.

15. The computer-based method of claim 13, wherein said one or more files are one or more text files.

16. A computer-based method for freeform-irregular cropping of images, the steps comprising:

providing a mobile electronic device;

wherein said mobile electronic device comprises: one or more display screens, one or more applications, and one or more files;

displaying said one or more applications on said one or more display screens;

creating a first transparent image-transparency with said one or more applications;

creating an Image-Transparency-A of said one or more files with said one or more applications;

positioning said Image-Transparency-A above said first transparent image-transparency to create a combined Image-Transparency-A and first transparent image-transparency;

processing said combined Image-Transparency-A and said first transparent image-transparency to create a first processed image-transparency;

creating a second transparent image-transparency;

positioning said second transparent image-transparency above said first processed image-transparency;

defining a cropped area on said second transparent image-transparency by a user;

creating a second processed image-transparency;

wherein said second processed image-transparency comprises a first cropped portion and a first un-cropped portion;

wherein said first cropped portion is defined by said cropped area;

superimposing said second processed image-transparency above said first processed image-transparency;

creating a second cropped portion on said first processed image-transparency by using said first cropped portion of said second processed image-transparency;

filling said cropped area based upon a device type, display type, IOS® version, and an image display size;

calculating one or more boundaries of said second cropped portion; and creating a freeform cropped image.

17. The computer-based method of claim 16, wherein said freeform cropped image comprises a rectangular box encapsulating said cropped area.

18. The computer-based method of claim 17, wherein said defining of said cropped area step is performed in freeform by said user.

19. The computer-based method of claim 18, wherein said defining of said cropped area step further comprises the steps of:

creating a freeform-irregular line;

wherein said freeform-irregular line is made by continuously contacting a surface of said one or more displays from a starting point to an endpoint; and enclosing said freeform-irregular line by connecting said starting point and said endpoint with a straight line.

20. The computer-based method of claim 19, the steps further comprising:

copying said freeform-irregular cropped image;

pasting said freeform-irregular cropped image to one or more documents; and sending electronically said freeform-irregular cropped image to a second electronic data processing unit;

wherein said first cropped portion and said first un-cropped portion contrast in one or more colors.

* * * * *